H. E. J. WACKWITZ.
COMBINATION TOOL.
APPLICATION FILED APR. 16, 1920.

1,387,214. Patented Aug. 9, 1921.

Inventor
H. E. J. Wackwitz
By Attorney

UNITED STATES PATENT OFFICE.

HENRY E. J. WACKWITZ, OF PORT WASHINGTON, NEW YORK, ASSIGNOR OF FORTY-NINE PER CENT. TO WALTER HEWETT, OF SANDS POINT ROAD, NEW YORK.

COMBINATION-TOOL.

1,387,214.  Specification of Letters Patent.  Patented Aug. 9, 1921.

Application filed April 16, 1920. Serial No. 374,300.

*To all whom it may concern:*

Be it known that I, HENRY E. J. WACKWITZ, a citizen of the United States of America, residing at Port Washington, New York, have invented a new and useful Combination-Tool, of which the following is a specification.

My invention relates particularly to a tool or implement for the use of painters.

The main object is to provide a simple and inexpensive device which can be carried in the pocket, and which can be used for a number of different purposes.

In the particular form shown, the implement constitutes a combination can-opener, screw-driver, paint hook, cutter, and bottle-opener.

It may conveniently be made of sheet metal, and consists of three parts pivoted together and adapted to be folded into a compact form convenient for carrying in the pocket.

Figure 1:
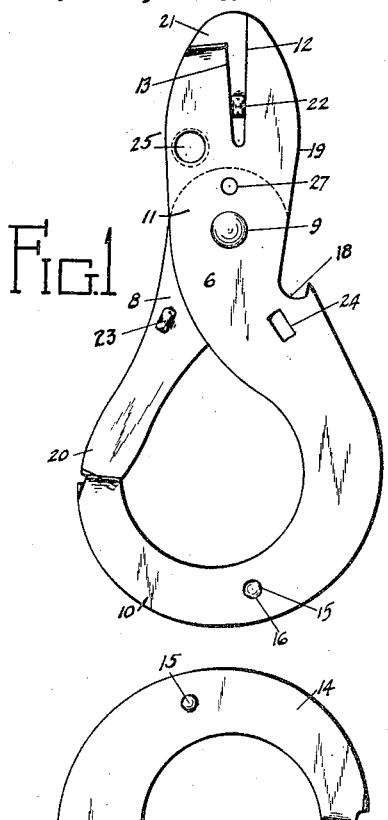
Figure 1 is a side view showing the implement folded into its most compact form and suitable for use as a bottle-opener.
Figure 2:
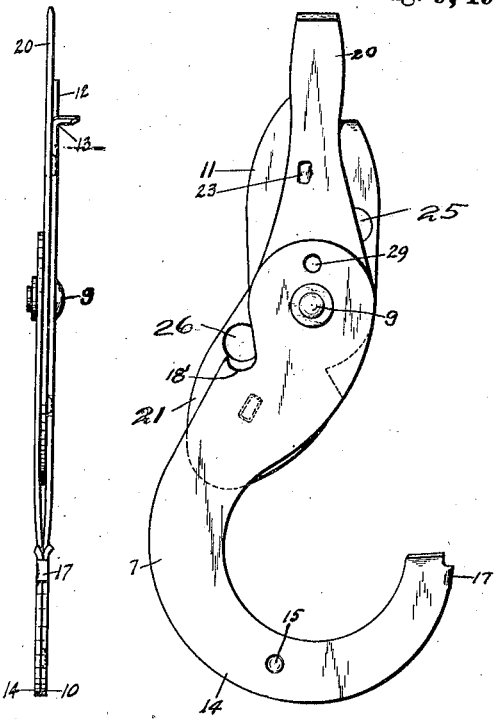
Fig. 2 is a view taken from the opposite side and showing the implement adjusted for use as a screw-driver.
Figure 3:
Fig. 3 is an edge view of the same.

The three parts 6, 7, and 8 are hinged or pivoted together on a rivet or stud 9 so that they are held snugly, but capable of being swung into different positions with relation to each other.

The main member 6 has a curved portion 10 terminating in a hook, and a shank portion 11 opposite thereto, which is slotted so as to provide a cutting edge 12, and a guard 13, so as to serve as a can-opener.

The member 7 has a correspondingly curved hook member 14. The two hook members 14 and 10 are provided with interfitting projections and recesses 15 and 16 respectively which serve to hold the parts together as shown in Figs. 1, 2, 3, and 4. One of the hooks, for instance 14, may also be provided with a stop 17 adapted to overstand the edge of the other hook.

The two members 6 and 7 are provided with claws 18 and 18' respectively, that are adapted to engage one edge of a bottle cap, while the shoulder 19 rests on the top of the bottle cap, so that the device may be used as a bottle-opener. In this case, the two curved members 10 and 14 serve as a convenient handle by which a substantial leverage may be secured. The two claws 18 and 18' being spaced apart the thickness of the member 8 serve as a double grip on the edge of the bottle cap.

Figure 5:
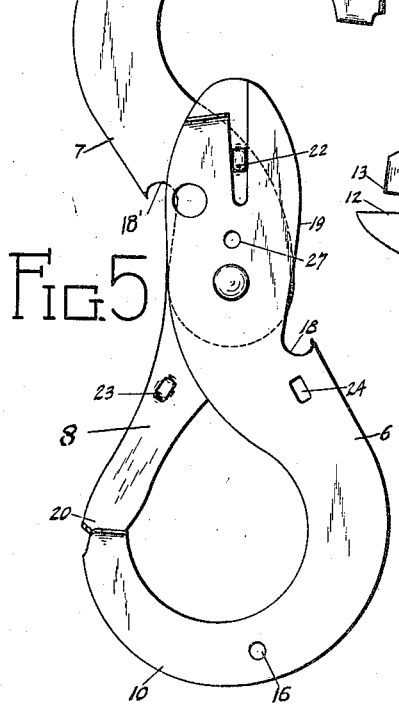
Fig. 5 shows the device opened out for use as a paint hook.

The member 8 has two arms 20 and 21 which serve respectively as guards for the hook 10 and for the can-opener when the parts are in the position shown in Figs. 1 and 5. The part 20 may conveniently be formed beveled at the end so that it may serve as a screw-driver when in the position of Figs. 2 and 3, at which time the curved members 10 and 14 furnish a convenient handle. The guard 21 may be provided with a projection 22, which is adapted to fit into the slot between the jaws 12 and 13 to hold the member 8 securely in the position of Figs. 1 and 5. The member 20 is similarly provided with a projection 23 adapted to engage in the same slot to hold the screw-driver in the position of Figs. 2 and 3.

Figure 4:
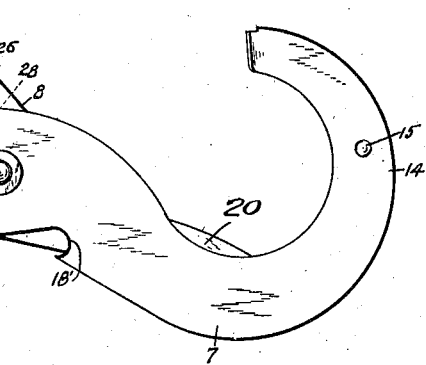
Fig. 4 shows the device adjusted for use as a can-opener.

The member 6 may be provided with a recess or opening 24 to receive the projection 23 when the parts are in the position of Fig. 4 so as to hold the member 8 out of the way when the device is to be used as a can-opener as shown in Fig. 4.

To use the device as a paint hook, the members 6 and 7 are spread out as shown in Fig. 5. In order to fasten the bail of a paint pot on the hook 10, it will, of course, be necessary to open up the guard 20, which when replaced, serves to prevent accidental disengagement of the hook from the bail.

The members 6 and 8 may be provided with openings 25 and 26 serving conveniently as a cigar cutter when the parts are in the position of Fig. 1, which is operated by pressing on the member 20.

Additional means for cutting off wire may be provided at the apertures 27, 28, and 29 if desired.

It will be obvious that a number of the foregoing features may be omitted without departing from the spirit or scope of my invention as set forth in the claims.

I claim:

1. A combination tool, comprising a can-opener and a screw-driver pivotally connected together, said can-opener having a portion serving to guard the end of said screw-driver, and said screw-driver having a portion serving to guard said can-opener and so arranged that when desired the guarding portions may be swung out of position so that a tool can be used.

2. A combination tool, comprising a can-opener terminating in a hook, a screw-driver pivotally connected thereto and having a portion serving as a guard for the can-opener, the hook of said can-opener serving to guard the end of said screw-driver, said screw-driver also serving to close the hook of said can-opener, means for holding the screw-driver in position to guard the can-opener and to close the hook, the whole so arranged that the guarding portions may be swung out of position as desired, and means for holding the guarding portions out of guarding position.

3. In a device of the character described, two hook members hinged together and a screw-driver hinged on the same axis, said members being adapted to be folded so that said hook members constitute a common handle for said screw-driver, and said screw-driver being adapted to serve as a guard for said hook members when they are folded together, and as a guard for one of said hook members when said hook members are unfolded.

4. In a device of the character described, two hooked-shaped members and a third member all hinged together, one of said members being provided with cutting jaws to constitute a can-opener, and one of the other members being adapted to guard said jaws when the members are folded together, one of said members serving as a handle for said can-opener when said jaws are unguarded.

HENRY E. J. WACKWITZ.